Feb. 16, 1932.   J. W. REUTHER   1,845,847
BAFFLE DEVICE FOR DISCHARGE FUNNELS
Filed Sept. 2, 1930

Inventor:-
Johann Wilhelm Reuther
by Langner, Parry, Card & Langner
Attys.

Patented Feb. 16, 1932

1,845,847

UNITED STATES PATENT OFFICE

JOHANN WILHELM REUTHER, OF HENNEF, GERMANY, ASSIGNOR TO THE FIRM OF HENNEFER MASCHINENFABRIK C. REUTHER & REISERT MIT BESCHRANKTER HAFTUNG, HENNEF-ON-THE-SIEG, GERMANY

BAFFLE DEVICE FOR DISCHARGE FUNNELS

Application filed September 2, 1930, Serial No. 479,344, and in Germany May 3, 1930.

This invention relates to a catch or baffle-device for use in discharge funnels particularly destined for discharging powdery or dusty material. The baffle device of the invention is especially necessary and useful when powdery or dusty material is to be weighed, and when the weighed material is to be forwarded by means of the discharge funnel to apparatus in which the material is to be sacked or filled into bags or the like.

The object of the invention is to remove certain drawbacks inherent to known devices.

Baffle-devices in discharge funnels have been suggested heretofore, which, however, merely consist of plane deflecting or catching surfaces or plates which in sloping downwardly contact on top with the walls of the funnel at an acute angle and thus form acute-angled spaces and corners. This arrangement has the drawback that on the powdery material dashing down within the discharge funnel, the dust whirling up and flung back settles firmly within such sharp angular spaces and corners, so that the discharged material is not fully delivered to its place of destination such as a bag, barrel or the like. This drawback is especially inconvenient, when it is a question of automatically weighing powdery materials in an automatic weighing apparatus.

The settling of dusty material in such sharp-angled spaces underneath deflecting or baffle plates takes place to a more or less extent according to the physical properties or the nature of the material to be discharged. Such settling of dust is particularly copious when cement is discharged through the funnel. The extremely fine cement powder sticks very closely together. As a consequence cement will settle (in spite of its considerable weight) in the cornered spaces and form thick layers. When such layer finally attains a considerable thickness and thus a great weight, the weight will overcome the adhering power, and the layer will loosen and fall down.

The object of the invention, therefore, is to avoid this great drawback in weighing and sacking off cement and powdery material of similar nature, and to prevent the sticking or adhering of the materials to the walls of the funnel within said corners. The settling down and accumulation of whirled up dusty material in dead spaces or corners is made impossible by doing away with the sharp- or acute-angled spaces or corners as a settling means for dust and by arranging a special baffling surface or plate preferably bent to form a curved or obtuse angled plate across such corner or space. Such cornerless baffle surface prevents any settling and accumulating of dustlike materials.

To fully understand the invention four discharge funnels are shown in the drawings in vertical section by way of example, constructed in the manner described.

Figure 1:
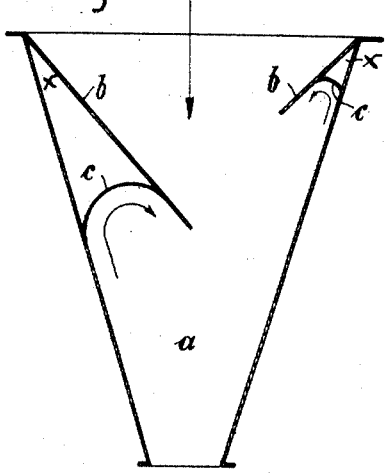
Fig. 1 shows a funnel having two corners in different height arranged opposite to each other.
Figure 2:
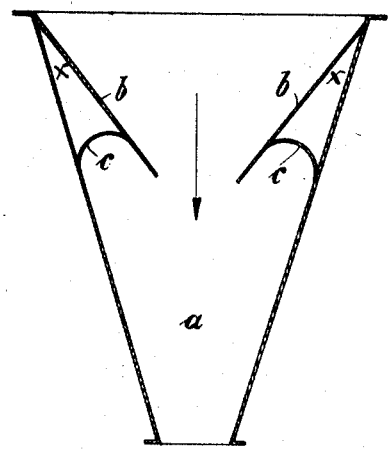
Fig. 2 shows a funnel with two corners at about the same height arranged opposite to each other.

In the discharge funnel $a$ shown in Figs. 1 and 2, two baffle plates $b$ forming plane guide plates are attached to the walls to form acute-angled spaces or corners $x$. In these spaces or corners heretofore the dust was apt to settle, to accumulate and finally to fall down.

Between the walls and the guide or baffle plates $b$ bent catch- or baffle-plates $c$ are mounted having their concave sides turned downwards. These bent cross baffle plates deflect the upwardly flying dusty material striking against the plates on one edge so that it glides to the other edge and is turned back again downwardly without having an opportunity to come to rest and settle thereon.

The arrangement of these bent or curved baffle-plates has the special advantage that the uprising air cannot cause a rise in pressure within the space formed between the baffle-plate $b$, and the baffle-plate $c$ whereas such rise in pressure is likely to occur within the sharp cornered spaces $x$.

With a device constructed in the new manner described the uprising air is bound to slide along the curved or bent plate *c* fully preventing any rise in pressure and the settling of dust.

Figure 3:
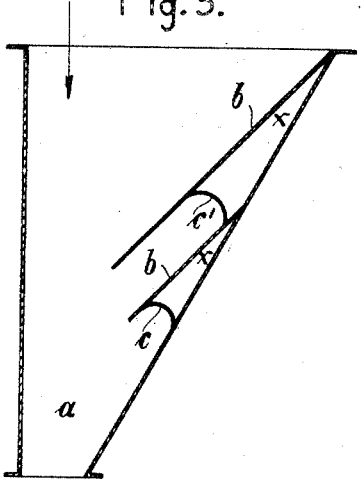
Fig. 3 shows a funnel with two corners lying one above the other.

In the construction shown in Fig. 3 two baffle-plates *b* are arranged on the same sidewall of the funnel one above the other at a suitable distance. These plates may be connected to each other by a bent or curved baffle-plate *c'* similar to the plate *c* connecting the lower baffle-plate *b* with the wall of the funnel *a*.

Figure 4:
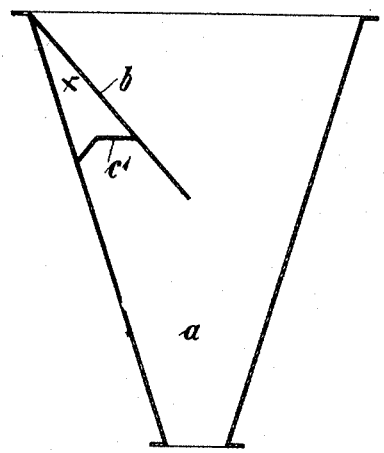
Fig. 4 shows a funnel having but one corner.

Instead of being bent to form a continuous curve the baffle-plate $c^1$ may be bent only to form an obtuse angle between the edges as is shown in Fig. 4.

I claim:

1. A baffle-device for discharge funnels adapted especially for discharging dusty material, comprising a guide-plate rigidly attached to a wall of the funnel and arranged at an acute angle to said wall, and means for preventing the accumulation of discharged material within the space confined by said funnel wall and said guide plate, said means being secured to said funnel wall and to said guide-plate and being adapted to deflect downwardly the upwardly flying dusty material.

2. A baffle device for discharge funnels adapted especially for discharging dusty material, comprising a guide plate arranged substantially at the upper part of said funnel and fixed thereto and arranged at an acute angle to the funnel wall, and a curved baffle plate secured to said wall and to said guide plate and located within the space confined by said wall and said guide plate, said baffle plate being adapted to prevent the accumulation of discharged material within said space and being further adapted to deflect downwardly the upwardly flying dusty material.

3. A baffle device for discharge funnels adapted especially for discharging dusty material, comprising a guide plate located substantially at the upper part of said funnel and fixed thereto, a second guide plate located on the same side of the funnel but underneath the first guide plate, said guide plate being arranged at an acute angle to the funnel wall, and curved baffle plates within the spaces confined by said wall and said guide plates, said baffle plates being adapted to prevent the accumulation of material within said spaces and being further adapted to deflect downwardly the upwardly flying dusty material.

4. A baffle device for discharge funnels adapted especially for discharging dusty material, comprising a guide plate disposed substantially at the upper part of said funnel and fixed thereto, and being arranged at an acute angle to the funnel wall, and an angularly bent baffle plate secured to said wall and to said guide plate and located within the space confined by said wall and said guide plate, said baffle plate being adapted to prevent the accumulation of discharged material within said space and being further adapted to deflect downwardly the upwardly flying dusty material.

In testimony whereof I have signed my name to this specification.

JOHANN WILHELM REUTHER.